(12) United States Patent
Bradfield

(10) Patent No.: US 8,416,039 B2
(45) Date of Patent: Apr. 9, 2013

(54) SOLENOID WITH REVERSE TURN SPOOL HUB PROJECTION

(75) Inventor: Michael D. Bradfield, Anderson, IN (US)

(73) Assignee: Remy Technologies LLC, Pendleton, IN (US)

( * ) Notice: Subject to any disclaimer, the term of this patent is extended or adjusted under 35 U.S.C. 154(b) by 189 days.

(21) Appl. No.: 12/767,710

(22) Filed: Apr. 26, 2010

(65) Prior Publication Data

US 2011/0260562 A1 Oct. 27, 2011

(51) Int. Cl.
*H01H 67/02* (2006.01)

(52) U.S. Cl. ........ 335/126; 335/131; 335/282; 336/192; 336/198

(58) Field of Classification Search ............ 335/126–13, 335/182, 266, 268, 282; 336/172, 192, 198
See application file for complete search history.

(56) References Cited

U.S. PATENT DOCUMENTS

| | | | |
|---|---|---|---|
| 4,295,066 A | 10/1981 | Lloyd et al. | |
| 4,473,811 A * | 9/1984 | Schauble | 336/171 |
| 4,536,728 A | 8/1985 | Cyrot | |
| 4,551,630 A | 11/1985 | Stahura et al. | |
| 5,563,563 A | 10/1996 | Freitas et al. | |
| 5,673,013 A | 9/1997 | Moody et al. | |
| 6,158,109 A | 12/2000 | Tanabe et al. | |
| 6,346,870 B1 * | 2/2002 | Bill et al. | 336/198 |
| 6,633,099 B2 | 10/2003 | Fulton et al. | |
| 7,145,259 B2 | 12/2006 | Spellman et al. | |
| 2002/0158519 A1 | 10/2002 | Fulton et al. | |
| 2004/0155536 A1 | 8/2004 | Cordiale et al. | |
| 2008/0197230 A1 | 8/2008 | Namba | |

* cited by examiner

*Primary Examiner* — Bernard Rojas
(74) *Attorney, Agent, or Firm* — Maginot, Moore & Beck

(57) ABSTRACT

A solenoid arrangement for a starter motor includes a plunger configured to move in an axial direction and a coil positioned radially outward from the plunger. The coil is wound on a spool that includes a first end and a second end with a hub extending between the first end and the second end. A projection is positioned on the hub of the spool. The coil engages the projection in such a manner that a winding direction of the coil is reversed at the projection.

18 Claims, 4 Drawing Sheets

CURRENT DIRECTION
⊙ OUT OF PAGE
⊗ INTO PAGE

CURRENT DIRECTION
⊙ OUT OF PAGE
⊗ INTO PAGE

SOLENOID WITH REVERSE TURN SPOOL HUB PROJECTION

FIELD

This application relates to the field of starter motor assemblies, and more particularly, to a solenoid assembly for a starter motor.

BACKGROUND

Starter motor assemblies that assist in starting engines, such as engines in vehicles, are well known. The conventional starter motor assembly broadly includes an electrical motor and a drive mechanism. The electrical motor is energized by a battery upon the closing of an ignition switch. The drive mechanism transmits the torque of the electric motor through various components to a flywheel gear of the engine, thereby cranking the engine until the engine starts.

During operation of the starter motor, the closing of the ignition switch (typically by turning a key) energizes a solenoid and, in some motors, applies some power to the electrical motor. Energization of the solenoid moves a solenoid shaft (also referred to herein as the "plunger") in an axial direction. The movement of the solenoid plunger closes electrical contacts, thereby delivering full power to the electrical motor. The movement of the solenoid plunger also biases a pinion-type gear into engagement with the engine flywheel gear. Engagement of the rotating pinion with the flywheel in turn causes the flywheel to rotate, thereby cranking the vehicle engine. Once the vehicle engine is started, the operator of the vehicle then will open the ignition switch, which deenergizes the solenoid assembly. As a result of this deenergization, the magnetic field that caused the plunger to move decreases and at some point is overcome by a return spring.

For the energization of the solenoid assembly to move the solenoid plunger and hold the plunger for pinion-flywheel engagement, solenoid assemblies typically utilize two coils, i.e., a pull-in coil and a hold-in coil. In these arrangements, both coils energize the plunger of the solenoid assembly to bias the plunger in the axial direction for engagement with the engine flywheel. Once the plunger engages the electrical contacts such that full power is delivered to the starter motor, the pull-in coil is effectively short circuited, eliminating unwanted heat generated by the coil. The hold-in coil then holds the plunger in place in order to hold the pinion in the engagement position with the flywheel until the engine starts.

In designing solenoid coil windings for a starter motor, including the design of pull-in coils and the hold-in coils, design challenges are encountered that relate to the physical dimensions of the coils, the electrical resistance of the windings, and the resulting amp-turn excitation that each coil provides. For example, in the case of a pull-in coil, it may be desirable to increase resistance in the coil without increasing the resulting amp-turn excitation of the coil. Increasing the resistance of the pull-in coil without increasing the resulting amp-turn excitation allows the coil to have a desired resistance and still provide a desired amount of amp-turn excitation for proper movement of the plunger within the solenoid. This allows the amp-turns for the pull-in coil and the hold in coil to be properly balanced such that a spring force on the plunger will return the plunger to its original position at engine start.

In meeting the foregoing design challenge of increased resistance without increased amp-turn excitation, reverse turns are often used in solenoid arrangements. FIGS. 6A-6C show an exemplary conventional coil and spool capable of providing a reverse turn in the coil windings. In these arrangements, a conductor 132 is first wound around a spool 150 to provide a first layer 134 of windings for a coil. Next, the conductor 150 is wrapped around a hook 158 on the flange of the spool. This allows the next layer 136 of the coil (shown incomplete in FIGS. 6B and 6C) to be wound in the opposite direction from the first layer 134. These two layers 134, 136 of coil wound in opposing directions result in a net amp-turn excitation of effectively zero, as the opposing excitation provided by the first two layers of windings cancel each other out.

While the above-described arrangement for increasing resistance without increasing the amp-turn excitation of the coil provides some level of flexibility for the designer, sometimes this level of flexibility isn't sufficient. For example, design constraints may not allow two full layers of reversing turns either from a spatial or resistance standpoint. Furthermore, conventional designs do not facilitate a design where reversing turns may be provided on the innermost layer of the coil. Accordingly, it would be desirable to provide a solenoid arrangement for a starter that allows the designer additional flexibility in providing the optimal resistance and amp-turn excitation of a coil. It would also be desirable if such a solenoid arrangement were relatively simple and inexpensive to implement.

SUMMARY

In accordance with one embodiment of the disclosure, there is provided a solenoid arrangement for a starter motor. The solenoid arrangement includes a plunger configured to move in an axial direction and a coil separated from the plunger and positioned radially outward from the plunger. The coil is wound on a spool that includes a first end and a second end with a hub extending between the first end and the second end. A projection is positioned on the hub of the spool. The coil engages the projection in such a manner that a winding direction of the coil is reversed at the projection.

Pursuant to another embodiment of the disclosure, there is provided a method of making a solenoid. The method includes winding a conductor in a first direction to provide a first part of a first layer of a coil. The conductor is then wound in a in a second direction opposite the first direction to provide a second part of the first layer of the coil. Thereafter, the conductor is wound over the first layer of the coil to form a second layer of the coil.

In accordance with yet another embodiment of the disclosure, there is provided a starter motor comprising an electric motor and a solenoid. The solenoid includes a plunger configured to move in an axial direction between a first position and a second position. In the second position, the plunger engages electrical contacts and closes an electrical circuit configured to provide power to the electric motor. A coil is wound around a coil retaining surface of the solenoid. A turn member is positioned on the coil retaining surface. The coil is wrapped at least partially around the turn member in order to change a winding direction of the coil from a first direction to a second direction that is opposite the first direction.

The above described features and advantages, as well as others, will become more readily apparent to those of ordinary skill in the art by reference to the following detailed description and accompanying drawings. While it would be desirable to provide a solenoid that provides one or more of these or other advantageous features, the teachings disclosed herein extend to those embodiments which fall within the scope of the appended claims, regardless of whether they accomplish one or more of the above-mentioned advantages.

DESCRIPTION

Figure 1:
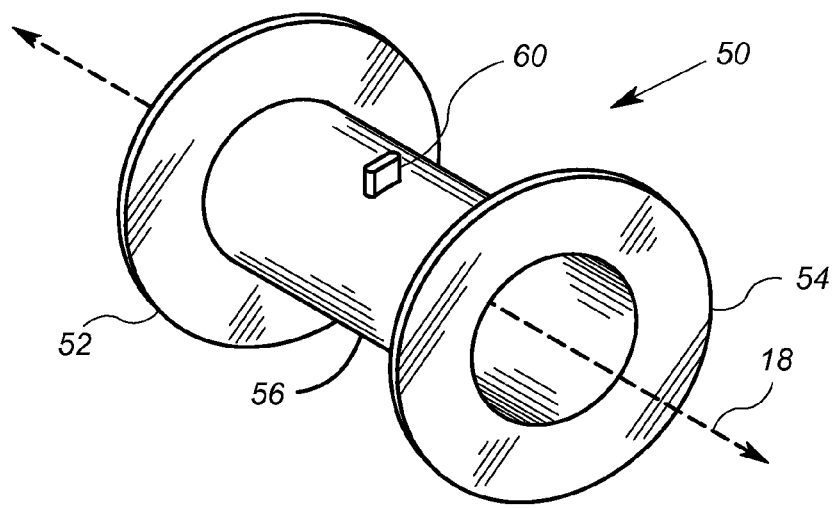
FIG. 1 shows a perspective view of a coil spool with reverse turn hub projection for a solenoid.

With reference to FIG. 1, a holder for a solenoid coil is shown in the form of a spool 50. The spool 50 includes a first end flange 52, a second end flange 54, and a hub 56 extending between the first end flange 52 and the second end flange 54. The flanges 52 and 54 are disc shaped with a center hole that allows a plunger to move in an axial direction through the center of the spool.

The hub 56 of the spool 50 is generally cylindrical in shape and provides a coil retaining surface of the solenoid coil. Although a right circular cylinder is shown in the embodiment of FIG. 1, it will be recognized that the hub 56 make take on other forms, including cylindrical and non-cylindrical forms. Furthermore, the term "spool" as used herein refers to any appropriate solenoid coil holder, regardless of whether the hub is provided as a cylinder or if flanges are included on the ends of the hub.

A projection 60 is provided on the hub 56 of the spool 50. The projection 60 extends radially outward from the outer surface of the hub 56, providing a protuberance on the hub. In at least one embodiment, the projection 60 is integrally formed on the spool 50, such as by injection molding of the spool and the projection as a single piece. In other embodiments, the projection may be connected to the spool using a fastener, welding, adhesive, or other connection means.

Figures 2, 3:
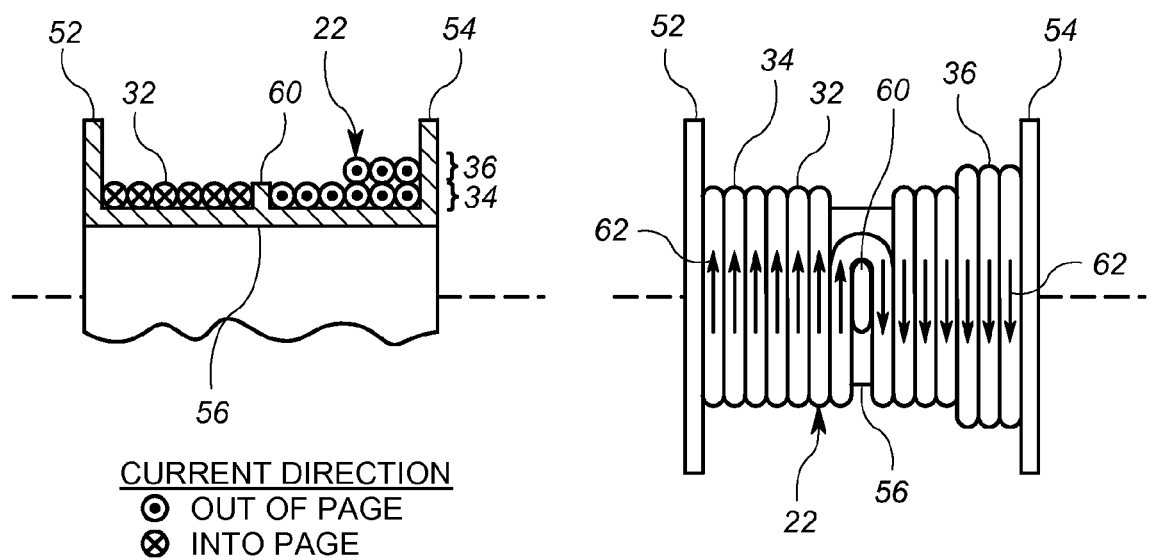
FIG. 2 shows a cross-sectional view of half of the spool of FIG. 1 with coil windings positioned on the spool.
FIG. 3 shows a top view of the spool of FIG. 1 with coil windings positioned on the spool.

In the embodiment of FIGS. 1-3, the projection 60 is provided as a tab positioned substantially in the center of the hub. The tab extends about 1.0 mm to 2.0 mm radially outward from the cylindrical outer surface of the hub 56. In other embodiments, the tab may extend a greater distance from the outer surface of the hub. The tab 60 is generally block shaped with rounded edges in order to avoid sharp edges that might cut into the coil. Although the projection 60 has been shown as a tab in FIGS. 2-4, it will be recognized that in other embodiments, the projection could be a post, a hook, or any other projection extending outward from the outer surface of the hub.

As shown in FIGS. 2 and 3, a conductor 32 is wound around the hub 56 of the spool 50 to form windings of a first coil 22. FIGS. 2 and 3 show a complete first layer 34 of windings and part of a second layer 36 of windings. In the first layer 34, the conductor 32 is wound in a first direction around the first half of the spool 50 until it reaches the projection 60. The conductor 32 then wraps around the projection 60 in such a manner that the winding direction of the coil 22 is reversed at the projection. The conductor 32 is then wrapped in the opposite direction around the second half of the spool 50. These differing directions are noted in FIG. 2 by the indicia that show current into and out of the page, and in FIG. 3 by the arrows 62 on the windings. Accordingly, the first layer 34 of the coil 22 includes a first half that is wound in a first direction and a second half that is wound in an opposite direction.

At the second end 54 of the spool 50, the conductor is wound twice around the hub 56, such that the coil transitions from a first layer 34 to a second layer 36. The conductor is then wound around the spool 50, moving toward the first end 52 of the spool. FIGS. 2 and 3 show three windings on the second layer 36. As shown in FIG. 3, because the windings of the second layer 36 are radially outward from the windings of the first layer 34, the second layer windings have a larger diameter. Furthermore, the windings of the second layer 36 do not wrap around the projection 60, and all windings of the second layer 36 are wound around the spool in the same direction.

Figure 4:
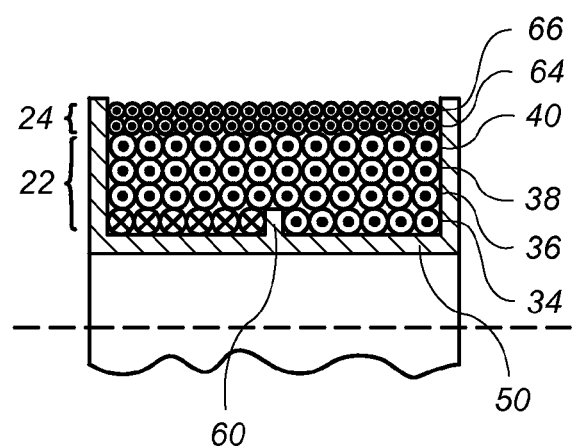
FIG. 4 shows a perspective view of the spool of FIG. 1 with a pull-in coil and a hold-in coil positioned on the spool.

FIG. 4 shows the complete first coil 22 positioned on the spool 50 as a coil with four layers 34, 36, 38 and 40. As discussed above, the winding direction of the first layer 34 changes at projection 60. As a result, when current flows through the coil 22 the resulting amp-turn excitation provided by the first layer 34 is cancelled out, leaving layers 36, 38 and 40 as the only layers that contribute to the total amp-turn excitation of the coil 22.

FIG. 4 also shows a second coil 24 positioned on the spool 50 radially outward from the first coil 22 and coaxial with the first coil. As described below with references to FIGS. 5A-5C, this second coil 24 may be used in a solenoid arrangement to provide a hold-in coil, while the first coil 22 may be used to provide a pull-in coil. Advantageously, the projection 60 provides the designer of the coil with a turn member that allows a single layer of the coil 22 to be included in the coil design that adds resistance to the coil without adding additional amp-turn excitation to the coil. This provides the coil designer with additional flexibility when considering the optimal amp-turn excitation of the two coils 22 and 24, resistance of the coils, and spatial constraints. Although the embodiments of FIGS. 2-4 show a turn member in the form of a projection, it will be recognized that a different turn member could be used in other embodiments. For example, in lieu of a projection, the turn member could be two openings in the outer surface of the hub with a center post in between the openings, thus allowing the conductor to be inserted into the first opening, pulled around the post, and out of the second opening.

Figure 5A:
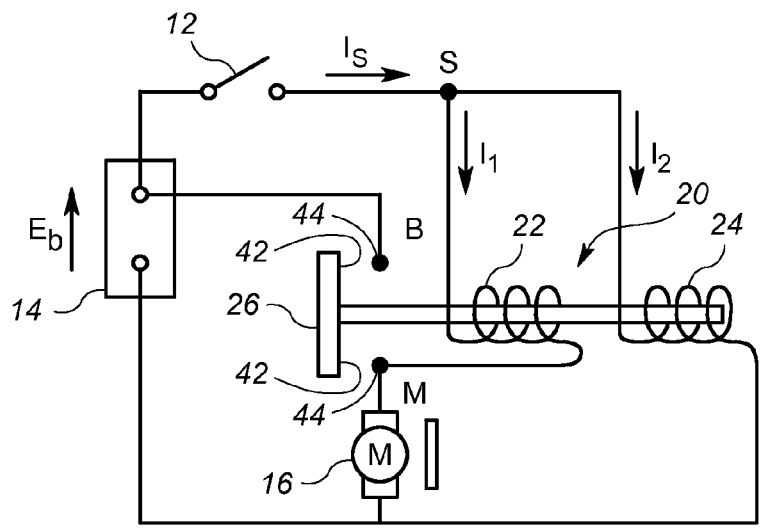
FIG. 5A shows a schematic of a starter motor arrangement including the solenoid with reverse turn hub projection of FIG. 1.
Figure 5B:
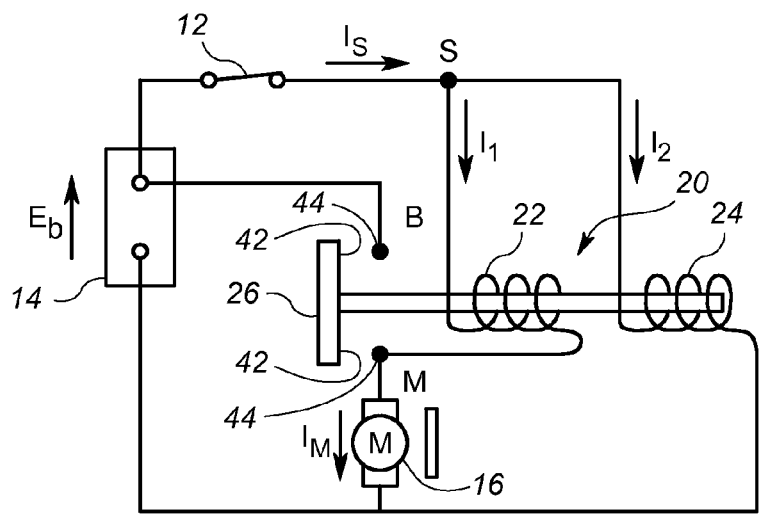
FIG. 5B shows the schematic of FIG. 5A with an ignition switch closed.
Figure 5C:
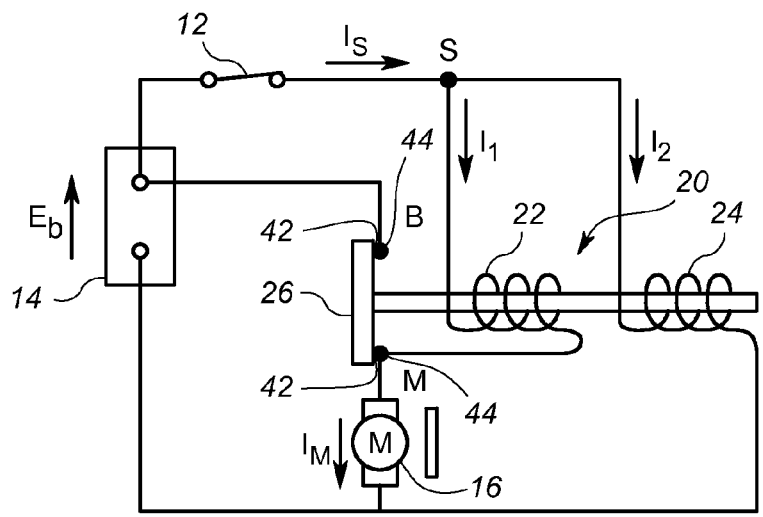
FIG. 5C shows the schematic of FIG. 5B with a solenoid plunger moved to a position where it engages electrical contacts in the starter motor.
Figure 6A:
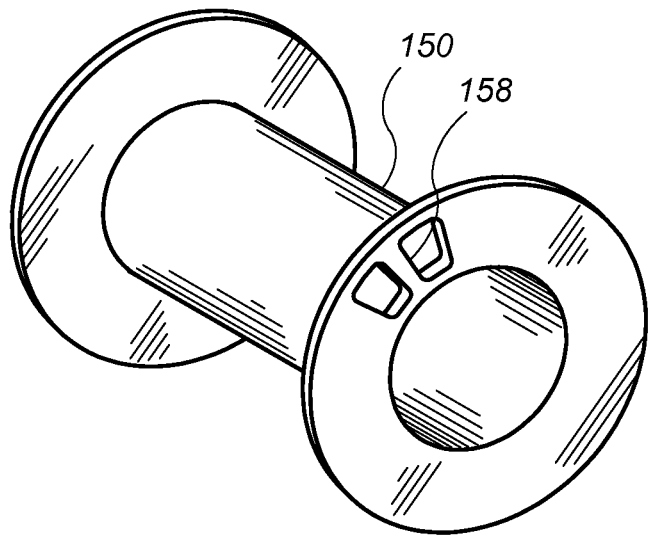
FIG. 6A shows a perspective view of a prior art spool for a solenoid.
Figure 6B:
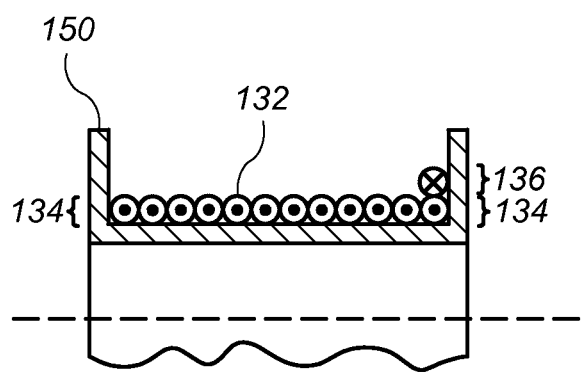
FIG. 6B shows a cross-sectional view of half of the spool of FIG. 6A with windings on the spool.
Figure 6C:
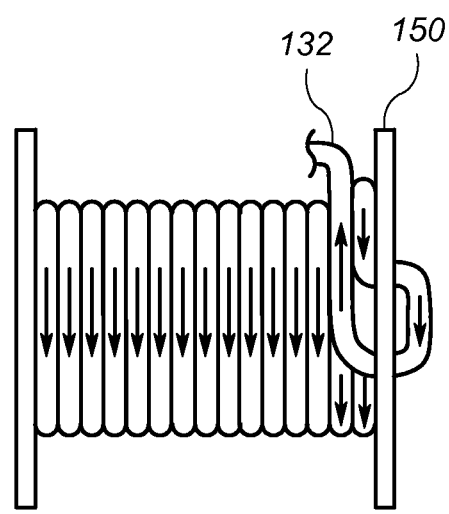
FIG. 6C shows a top view of the spool of FIG. 6A with windings positioned on the spool.

FIGS. 5A-5C are circuit diagrams illustrating the sequence of starting the starter motor in at least one embodiment of the starter motor with the solenoid assembly disclosed herein. As shown, the electrical circuit 10 for the starter motor includes an ignition switch 12, a battery 14, a motor 16, and a solenoid assembly 20. The solenoid assembly includes a solenoid coil holder 50 with a reverse turn spool hub projection 60 (as described above in FIGS. 1-4). A pull-in coil 22 is positioned on the coil holder and a hold-in coil 24 is positioned radially outward from the pull-in coil. The pull-in coil and the hold-in coil may be made of conductors in the form of insulated wound wire wrapped around the coil holder. As discussed above, the pull-in coil 22 includes a plurality of layers of increasingly greater diameter on the holder 50. The winding direction of the first layer of the coil may be reversed at the projection to meet the design requirements of the coil related to resistance of the coil and total amp-turn excitation of the coil.

FIG. 5A illustrates that point in time before ignition switch 12 is closed. At this point in time, coils 22, 24 are not energized, no electrical current is traveling through motor 16, and plunger 26 is not magnetized and, thus, not biased in an axial direction.

FIG. 5B illustrates that point in time when ignition switch 12 is closed, thereby energizing pull-in coil 22 and hold-in coil 24. Energization of coils 22, 24 in turn biases the plunger 26 to move in an axial direction (see axis 18 in FIG. 1) to effect the closing of a plunger contact 42 and two fixed contacts 44 between battery 14 and motor 16 to deliver full power to motor 16 from battery 14. Plunger contact 42 may be a copper washer and fixed contacts 44 are the heads of copper bolts.

FIG. 5C illustrates that point in time when plunger 26 is biased in the axial direction sufficiently to close contacts 42, 44 between battery 14 and motor 16, thereby delivering full power to motor 16 from battery 14. Once plunger 26 closes the contacts 42, 44, pull-in coil 22 is bypassed or short-circuited as shown in FIG. 5C.

The magnetomotive force of the pull-in coil 22 and the hold-in coil 24 add together to pull the plunger at large air gaps, when the reluctance of the magnetic circuit is highest. During the hold-in phase (i.e., during cranking of the engine), the air gap in the magnetic circuit is very small. Therefore, the reluctance of the magnetic circuit is low, and only a relatively small magnetomotive force is required to hold the plunger for pinion-flywheel engagement. Because only a small magnetomotive force is required to hold the plunger for pinion-flywheel engagement, unwanted heating from the pull-in coil is eliminated by short circuiting this coil when the contacts close to start the motor, as discussed above.

The foregoing detailed description of one or more embodiments of the solenoid with reverse turn spool hub projection has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

What is claimed is:

1. A solenoid arrangement for a starter motor comprising:
   a plunger configured to move in an axial direction;
   a coil positioned radially outward from the plunger, the coil including a first winding layer and at least one additional winding layer positioned radially outward from the first winding layer, the first winding layer including a first portion wound in a first winding direction and a second portion wound in a second winding direction that is opposite the first winding direction, the at least one additional winding layer wound only in the second winding direction and positioned radially outward from both the first portion and the second portion of the first winding layer;
   a spool including a first end and a second end with a hub extending between the first end and the second end; and
   a projection positioned on the hub, wherein the coil is wound on the spool and engages the projection in such a manner that a winding direction of the coil is reversed at the projection.

2. The solenoid of claim 1 wherein the projection is a tab extending radially outward from the coil engaging portion of the hub.

3. The solenoid of claim 2 wherein the projection extends about 1.0 mm to 2.0 mm outward from an outer surface of the hub.

4. The solenoid of claim 2 wherein the tab and hub are integrally formed.

5. The solenoid of claim 1 wherein the spool further includes flanges positioned on the first end and the second end of the spool.

6. The solenoid of claim 1 wherein the projection is positioned substantially in the center of the hub.

7. The solenoid of claim 1 wherein the coil is a first coil and the solenoid further comprises a second coil arranged coaxial with and radially outward from the first coil.

8. The solenoid of claim 7 wherein the first coil is a pull-in coil and the second coil is a hold-in coil.

9. The solenoid of claim 8 wherein the plunger is configured to move in the axial direction when the pull-in coil and the hold-in coil are energized and engage contacts on the starter motor in order to close a circuit that provides electrical power to the starter motor.

10. A method of making a solenoid, the method comprising:
    winding a conductor in a first direction to provide a first part of a first layer of a coil;
    winding the conductor in a second direction to provide a second part of the first layer of the coil, the second direction opposite the first direction; and
    winding the conductor in the second direction over the first part and the second part of the first layer of the coil to form a second layer of the coil.

11. The method of claim 10 further comprising winding the conductor over the second layer of the coil to form a third layer of the coil, wherein the conductor is only wound in the second direction during winding the conductor over the first second layer of the coil.

12. The method of claim 10 wherein the conductor is wound around a spool surface during the winding the conductor in the first direction and the winding the conductor in the second direction.

13. The method of claim 12 further comprising wrapping the conductor at least partially around a projection on the spool surface in order to transition from winding the conductor in the first direction to winding the conductor in the second direction.

14. The method of claim 12 wherein the spool surface is the outer surface of a cylindrical hub that extends between a first flange and a second flange.

15. The method of claim 10 wherein the conductor is a first conductor and the coil is a pull-in coil on the solenoid, the method further comprising winding a second conductor over the pull-in coil to provide a hold-in coil for the solenoid.

16. A starter motor comprising:
    an electric motor;

a solenoid including a plunger configured to move in an axial direction between a first position and a second position, wherein the plunger engages electrical contacts in the second position and closes an electrical circuit configured to provide power to the electric motor, a coil wound around a coil retaining surface of a coil holder, the coil retaining surface extending between a first end and a second end of the coil holder; and a turn member positioned on the coil retaining surface of the coil holder, wherein the coil is wrapped at least partially around the turn member in order to change a winding direction of the coil from a first direction to a second direction that is opposite the first direction, wherein the coil engages the turn member in a first layer of the coil such that the first layer includes a first portion wound in a first direction and a second portion wound in a second direction, and wherein the coil includes at least one additional winding layer positioned radially outward from the first winding layer, the at least one additional winding layer wound in the second direction around both the first portion and the second portion of the first layer.

17. The starter motor of claim 16 wherein the coil is a pull-in coil and the solenoid further includes a hold-in coil positioned radially outward from the pull-in coil, and wherein the plunger is configured to move in the axial direction when the pull-in coil and the hold-in coil are energized and engage the electrical contacts.

18. The starter motor of claim 16 wherein the coil retaining surface is a cylindrical surface and the turn member is a projection, wherein the coil engages the projection in a first layer of the coil such that the winding direction of the coil changes at the projection, and wherein the coil includes a plurality of additional winding layers positioned radially outward from the first winding layer.

* * * * *